UNITED STATES PATENT OFFICE.

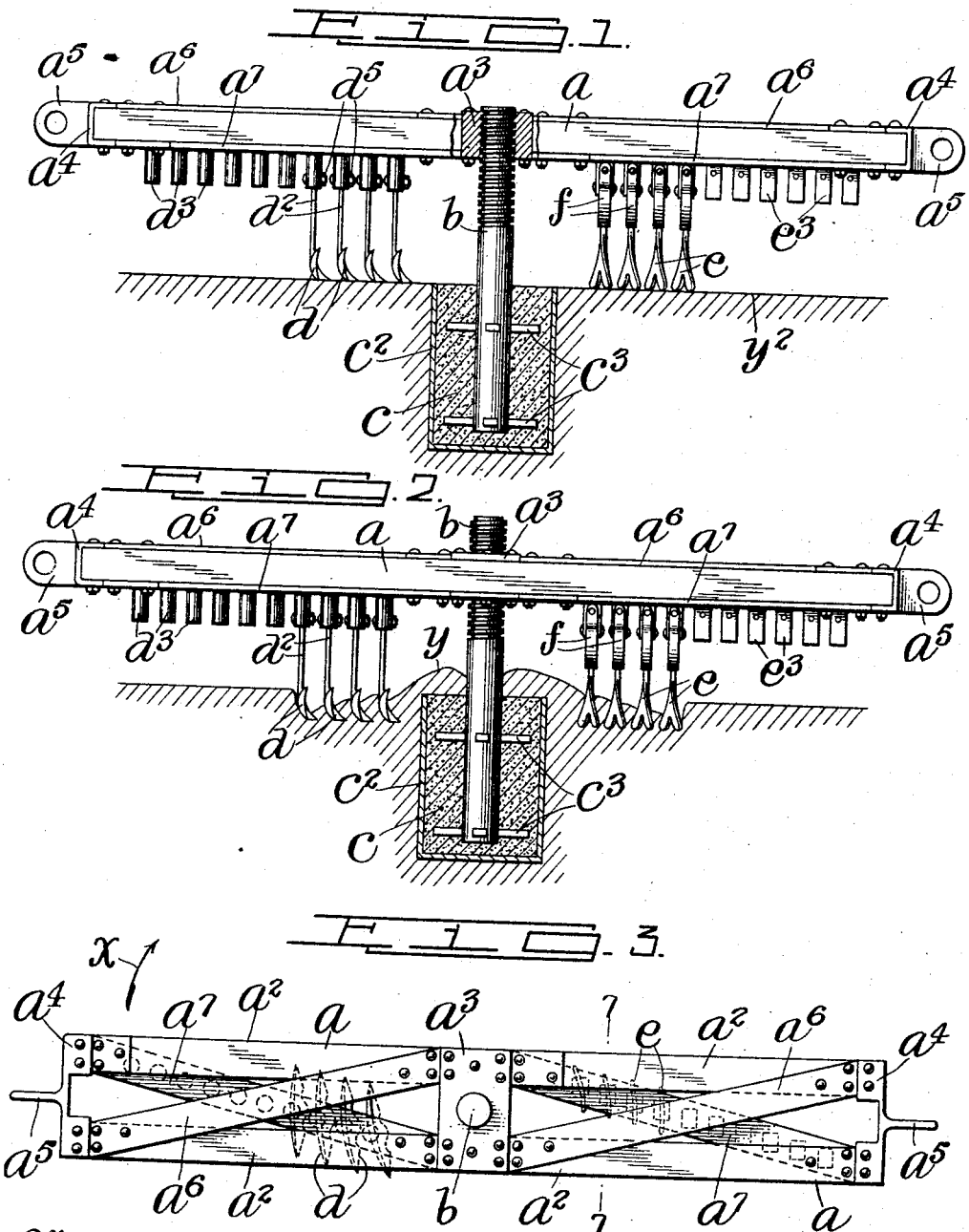

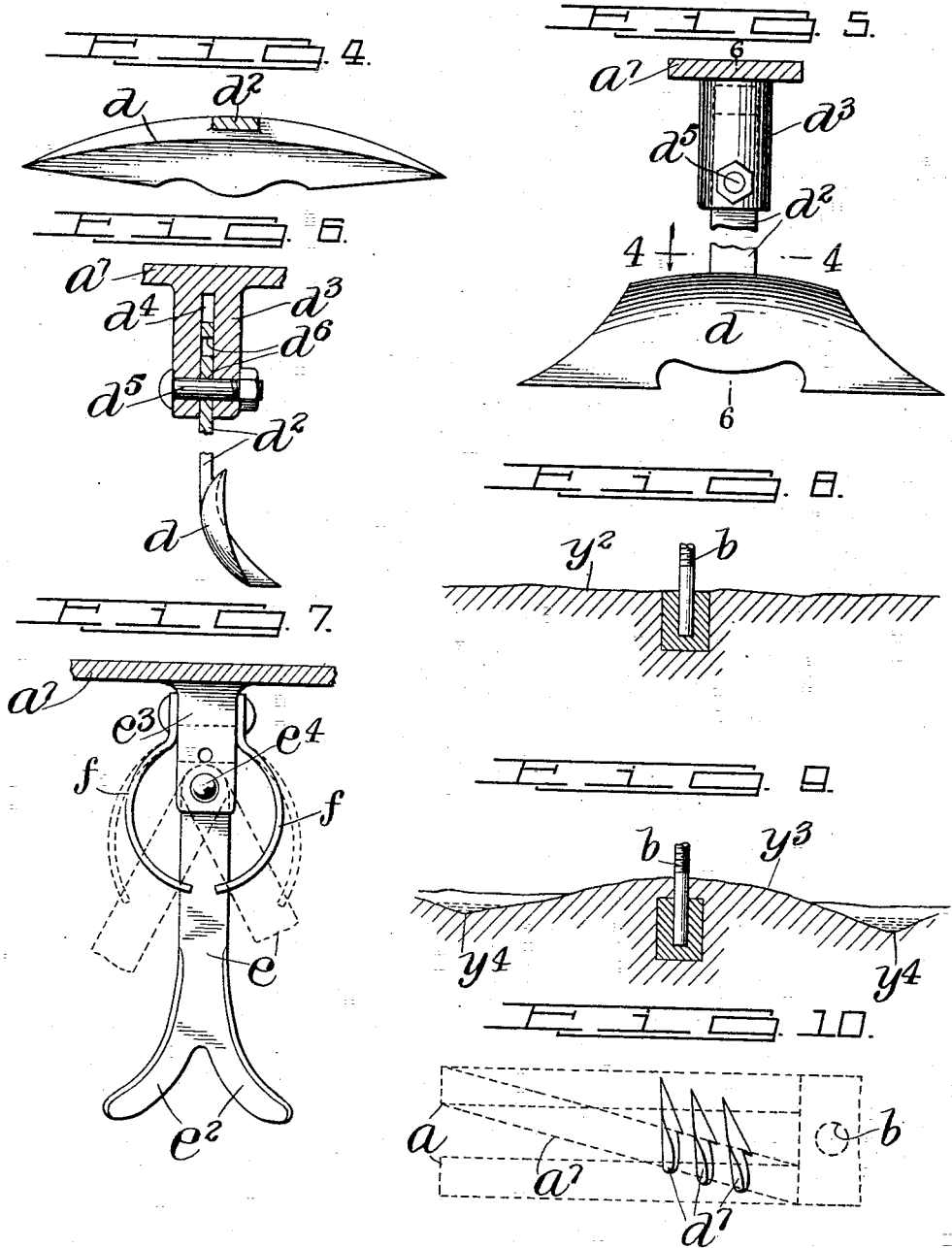

JOHN P. BEARDALL, OF BROOKLYN, NEW YORK.

SWAMP-PLOW.

1,182,961.  Specification of Letters Patent.  Patented May 16, 1916.

Application filed April 29, 1915. Serial No. 24,630.

*To all whom it may concern:*

Be it known that I, JOHN P. BEARDALL, a citizen of the United States, and residing at Brooklyn, in the county of Kings and State of New York, have invented certain new and useful Improvements in Swamp-Plows, of which the following is a specification, such as will enable those skilled in the art to which it appertains to make and use the same.

This invention relates to plows for use in breaking up and draining swamp, bog and other soft and mushy land, and the object thereof is to provide an improved plow for this purpose, whereby land of the class specified may be plowed up in small bodies or patches of circular form, in which operation the land so plowed is thrown toward the center of the bodies or patches so formed and raised above the common level, and whereby depressed spaces and channels or furrows are produced between the circular bodies or patches so plowed and into which the water in the swamp or bog is drained, and whereby the plowed and raised bodies or patches may be successfully planted or sown, and the growth of the seed or plant so planted or sown will not be prevented by water coming in contact therewith or the roots thereof.

It is a well-known fact that even where soft swamp or bog land can be planted in the early spring the plants may spring up quickly and grow freely for a short time, after which the cold water which comes in contact with the roots of the plant, especially if the weather is cool, will stop the growth of the plant and the said plant will change color, and droop, and die; but with my improved plow the land may be broken up, or plowed up in small patches or bodies which are raised above the common level and from which the water will be drained to a depth sufficient to permit of the growth or full development of the plant, and as lands of the class specified are the most rich and productive in quality of all lands, a great and practical advantage and improvement is accomplished.

The invention is fully disclosed in the following specification, of which the accompanying drawing forms a part, in which the separate parts of my improvement are designated by suitable reference characters in each of the views, and in which:—

Figure 1 is a sectional side view of a plow apparatus involving my invention and showing the method of mounting the same; Fig. 2 a view similar to Fig. 1 but indicating the result of the use of the plow; Fig. 3 a plan view; Fig. 4 a section on the line 4—4 of Fig. 5; Fig. 5 a view showing the method of mounting a plowshare which I employ and on an enlarged scale; Fig. 6 a section on the line 6—6 of Fig. 5; Fig. 7 a partial section on the line 7—7 of Fig. 3, and showing a detail of construction on an enlarged scale; Fig. 8 a view showing the normal position or condition of the ground before it is plowed as is also indicated in Fig. 1; Fig. 9 a view similar to Fig. 8 but showing the condition after the ground is plowed; and, Fig. 10 a view similar to Fig. 3 but indicating only a modified form of construction, and a detail thereof.

In the practice of my invention, I provide a beam $a$ which, in the construction shown, is made, in the form of a frame, or consists of parallel side bars $a^2$, a central block member $a^3$, and cross head end portions $a^4$ provided, in the form of construction shown, with handles $a^5$ for which ordinary clevis devices may be substituted, if desired, and the opposite end portions of said beam are provided with longitudinal and diagonal brace bars or members $a^6$ and $a^7$.

The beam $a$ is adapted to be mounted on a central screw shaft $b$ which passes through the central block member $a^3$ which is correspondingly threaded and the lower end of the shaft $b$ is supported in a concrete block $c$ countersunk in the ground, or in a barrel or similar receptacle $c^2$, and the lower end of the shaft $b$, or that part thereof which is sunk into the concrete block $c$ is provided with radial arms or similar devices $c^3$ which prevent it from turning in said concrete block or base.

One end of the beam $a$, in the construction shown, is provided with or carries a plurality of plowshares $d$, and the other a plurality of sod cutting blades $e$, and the plowshares $d$ are suspended from the corresponding beam bar or member $a^7$ and the blades $e$ from the corresponding beam or bar member $a^7$.

In the construction shown the plowshares $d$ are provided with shanks $d^2$ and the corresponding bar or beam member $a^7$ with hangers $d^3$ having central longitudinal slots or apertures $d^4$ into which the shanks $d^2$ of the plowshares pass, and said shanks are held in said hangers by bolts $d^5$ and provided with a plurality of apertures $d^6$ whereby the plowshares and their shanks may be vertically adjusted.

The plowshares $d$, in the construction shown in Figs. 1 to 6 inclusive, are double shares, or project in the same manner both forwardly and backwardly, and may be operated in either direction, and said plowshares, in practice are curved as shown, the land side thereof being convex in longitudinal section, and said plowshares are also set on the arcs of circles, the center of which is the center of the shaft $b$.

The blades $e$ are preferably made, as shown in Fig. 7, said blades being forked at their lower ends as shown at $e^2$ to provide oppositely curved members, whereby they will operate in either direction as the beam $a$ is turned and the beam member or bar $a^7$ with which the blades $e$ are connected is provided with hangers $e^3$ having slots in their lower ends in which the shank portions of the blades $e$ are pivoted as shown at $e^4$, and secured to the opposite sides of the hangers $e^3$ are curved plate springs $f$, the free ends of which are slotted to receive the opposite side edges of the blades $e$, or the shank portions thereof, and this construction will permit of a slight forward and backward movement of the blades $e$ in the operation of the plow, as hereinafter described, as indicated in dotted lines in Fig. 7.

The operation of the plow as thus constructed will be readily understood from the foregoing description when taken in connection with the accompanying drawing and the following statement thereof. It will be understood that any desired number of the concrete base blocks or supports $c$ may be employed with corresponding shafts $b$, and these may be distributed at regular intervals over or in the surface of the ground to be plowed, and in practice the beam $a$ is mounted on the shaft $b$, as shown in Fig. 1, and may be turned thereon either by hand or by horsepower applied to either or both ends thereof. With the construction shown, the beam $a$ may be turned in either direction, but is preferably first turned in the direction of the arrow $x$ in Fig. 3, and the plowshares $d$ will operate to plow up and throw the land inwardly in a circle around the shaft $b$ as indicated at $y$ in Fig. 2, and in this operation the blades $e$ turn with the beam in the same manner as the plowshares and precede said plowshares and cut any grass, weeds or vines that may encumber the land and would otherwise interfere with the operation of the plows or plowshares, and these blades also serve to stir up the ground. In the construction shown, only four plowshares and four blades $e$ are employed, or shown, on the opposite ends of the beam $a$, but a greater number of the hangers $d^3$ and $e^3$ are shown, and any desired number of said plowshares and blades may be employed, and it will be understood that the beam $a$ may be made in any desired manner and may be made in any preferred length, in operating the beam $a$, or as it is turned in the direction of the arrow $x$ it gradually descends on the shaft $b$, and when it reaches the bottom of its desired movement in this operation the direction of the rotation is reversed and the ground first plowed will be re-plowed beginning at the outer side thereof, and said plowed ground will be thrown farther inwardly or toward the center of the body or patch of land being plowed. The blades $e$ are connected with the hangers $e^3$ in the same manner as the shanks of the plowshares as clearly indicated in Fig. 7, and may also be vertically adjusted, and in the construction shown it will be seen that the plowshares and blades are not in direct radial line with the shaft $b$ but are set somewhat obliquely thereto, but my invention is not limited to any particular method of connecting the plowshares and blades with the beam $a$, or of supporting said plowshares and blades in connection with said beam, and this work may be done in any preferred manner, and said plowshares may be adjustable longitudinally of the beam, if desired, and even the use of the blades $e$ is not absolutely essential or at least desirable under all conditions.

In Fig. 1, I have indicated at $y^2$ the surface of the land before it is plowed and also in Fig. 8, and in Fig. 9 I have indicated, or attempted to indicate at $y^3$, the surface of that part of the land which has been plowed from which it will be seen that as a result of the operation of my improved plow those portions of the land which are plowed are raised or lifted in the manner of mounds around which are channels, furrows or the like $y^4$ through which the water drains off.

In Fig. 10 I have indicated at $d^7$ plowshares of the usual form, or which may be operated in one direction only, and it must be understood that my invention is not limited to the various details of construction herein shown and described, nor to any particular form of plowshares, and changes in and modifications of the various details of my improvement, as herein set out may be made, within the scope of the appended claims without departing from the spirit of my invention or sacrificing its advantages, and other means may also be employed for supporting the screw shaft $b$.

Having fully described my invention, what I claim as new and desire to secure by Letters Patent, is:—

1. A plow beam horizontally and rotatably mounted on a vertical support and on which said beam is vertically movable as it is rotated, said beam being provided with suspended plowshares.

2. In a plow of the class described, a vertical support consisting of a threaded shaft and a threaded beam mounted horizontally on said shaft and adapted to rotate thereon and vertically movable thereon.

3. A plow beam adapted to be mounted on a vertical support on which it is rotatable in both directions and vertically movable as it is rotated, said beam being also provided with suspended double plowshares adapted to operate in either direction in which the beam may be rotated.

4. A plow beam adapted to be mounted on a vertical support on which it is rotatable in both directions and vertically movable as it is rotated, said beam being also provided with suspended double plowshares adapted to operate in either direction in which the beam may be rotated and being also vertically adjustable.

In testimony that I claim the foregoing as my invention I have signed my name in presence of the subscribing witnesses this 24th day of April, 1915.

JOHN P. BEARDALL.

Witnesses:
C. MULREANY,
H. E. THOMPSON.

Copies of this patent may be obtained for five cents each, by addressing the "Commissioner of Patents, Washington, D. C."